United States Patent
Benedict

(10) Patent No.: US 9,631,843 B2
(45) Date of Patent: Apr. 25, 2017

(54) MAGNETIC DEVICE FOR MAGNETO CALORIC HEAT PUMP REGENERATOR

(71) Applicant: General Electric Company, Schenectady, NY (US)

(72) Inventor: Michael Alexander Benedict, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 210 days.

(21) Appl. No.: 14/621,935

(22) Filed: Feb. 13, 2015

(65) Prior Publication Data

US 2016/0238287 A1 Aug. 18, 2016

(51) Int. Cl.
*F25B 21/02* (2006.01)
*F25B 21/00* (2006.01)
*F25D 11/00* (2006.01)

(52) U.S. Cl.
CPC ...... *F25B 21/00* (2013.01); *F25B 2321/0022* (2013.01); *F25D 11/00* (2013.01)

(58) Field of Classification Search
CPC .............................. F25B 21/00; Y02B 30/66
USPC ............................................................ 62/3.1
See application file for complete search history.

(56) References Cited

U.S. PATENT DOCUMENTS

| | | | |
|---|---|---|---|
| 668,560 A | 2/1901 | Fulner et al. | |
| 4,107,935 A | 8/1978 | Steyert, Jr. | |
| 4,507,927 A | 4/1985 | Barclay | |
| 4,549,155 A | 10/1985 | Halbach | |
| 4,625,519 A | 12/1986 | Hakuraku et al. | |
| 4,642,994 A | 2/1987 | Barclay et al. | |
| 4,727,721 A * | 3/1988 | Peschka | F25B 21/00 62/3.1 |
| 5,091,361 A * | 2/1992 | Hed | F25B 21/00 257/E39.018 |
| 5,156,003 A | 10/1992 | Yoshiro et al. | |
| 5,249,424 A | 10/1993 | DeGregoria et al. | |
| 5,934,078 A | 8/1999 | Lawton, Jr. et al. | |
| 6,332,323 B1 | 12/2001 | Reid et al. | |

(Continued)

FOREIGN PATENT DOCUMENTS

CA 2893874 A1 6/2014
CN 101979937 10/2010

(Continued)

OTHER PUBLICATIONS

International Search Report and Written Opinion issued in connection with PCT Application No. PCT/US2014/042485 dated Oct. 31, 2014.

(Continued)

*Primary Examiner* — Melvin Jones
(74) *Attorney, Agent, or Firm* — Dority & Manning, P.A.

(57) ABSTRACT

A magnetic device is provided for a magneto caloric heat pump regenerator. Magnets are arranged within two magnetic flux circuits in a manner than that provides at least four fields of increased magnetic flux density. The regenerator can be used to move working units of magneto caloric material through the fields of increase magnetic flux to provide for heating and cooling as part of heat pump cycle. The orientation of the magnets provides concentrated fields of magnetic flux to induce the magneto caloric effect while optimizing the size of the magnets required to create the fields.

18 Claims, 7 Drawing Sheets

(56) References Cited

U.S. PATENT DOCUMENTS

| | | |
|---|---|---|
| 6,446,441 B1 | 9/2002 | Dean |
| 6,588,215 B1 | 7/2003 | Ghoshal |
| 6,668,560 B2 | 12/2003 | Zimm et al. |
| 6,935,121 B2 | 8/2005 | Fang et al. |
| 7,552,592 B2 | 6/2009 | Iwasaki et al. |
| 7,644,588 B2 | 1/2010 | Shin |
| 7,897,898 B2 | 3/2011 | Muller et al. |
| 8,099,964 B2 | 1/2012 | Saito et al. |
| 8,209,988 B2 | 7/2012 | Zhang et al. |
| 8,375,727 B2 | 2/2013 | Sohn |
| 8,378,769 B2 | 2/2013 | Heitzler et al. |
| 8,448,453 B2 | 5/2013 | Bahl et al. |
| 8,551,210 B2 | 10/2013 | Reppel et al. |
| 8,656,725 B2 | 2/2014 | Muller et al. |
| 8,695,354 B2 * | 4/2014 | Heitzler ............... F25B 21/00 62/3.1 |
| 8,729,718 B2 | 5/2014 | Kuo et al. |
| 8,769,966 B2 | 7/2014 | Heitzler et al. |
| 8,869,541 B2 | 10/2014 | Heitzler et al. |
| 8,935,927 B2 | 1/2015 | Kobayashi et al. |
| 2010/0071383 A1 | 3/2010 | Zhang |
| 2010/0236258 A1 | 9/2010 | Heitzler et al. |
| 2011/0162388 A1 | 7/2011 | Barve et al. |
| 2011/0173993 A1 | 7/2011 | Muller et al. |
| 2011/0182086 A1 | 7/2011 | Mienko et al. |
| 2011/0192836 A1 | 8/2011 | Muller et al. |
| 2011/0239662 A1 | 10/2011 | Bahl et al. |
| 2011/0308258 A1 | 12/2011 | Smith et al. |
| 2012/0079834 A1 | 4/2012 | Dinesen et al. |
| 2012/0222427 A1 | 9/2012 | Hassen |
| 2012/0267090 A1 | 10/2012 | Kruglick |
| 2012/0272665 A1 * | 11/2012 | Watanabe ............. F25B 25/005 62/3.1 |
| 2012/0272666 A1 | 11/2012 | Watanabe |
| 2012/0285179 A1 | 11/2012 | Morimoto |
| 2013/0019610 A1 | 1/2013 | Zimm et al. |
| 2013/0187077 A1 | 7/2013 | Katter |
| 2013/0192269 A1 | 8/2013 | Wang |
| 2013/0232993 A1 | 9/2013 | Saito et al. |
| 2014/0165595 A1 | 6/2014 | Zimm et al. |
| 2014/0190182 A1 | 7/2014 | Benedict |
| 2014/0216057 A1 | 8/2014 | Oezcan |
| 2014/0290273 A1 | 10/2014 | Benedict et al. |
| 2014/0325996 A1 | 11/2014 | Muller |
| 2015/0027133 A1 | 1/2015 | Benedict |
| 2015/0168030 A1 | 6/2015 | Leonard et al. |

FOREIGN PATENT DOCUMENTS

| | | |
|---|---|---|
| CN | 101979937 | 2/2011 |
| CN | 103090583 A | 5/2013 |
| EP | 2108904 A1 | 10/2009 |
| JP | 2002315243 A | 10/2002 |
| JP | 2007147136 | 6/2007 |
| JP | 2007/291437 A | 11/2007 |
| JP | 2007291437 A | 11/2007 |
| JP | 2008051412 | 3/2008 |
| KR | 101100301 B1 | 12/2011 |
| KR | 1238234 B1 | 3/2013 |
| WO | WO 02/12800 | 2/2002 |
| WO | WO 03016794 | 2/2003 |
| WO | WO2007/036729 A1 | 4/2007 |
| WO | WO2009/024412 | 2/2009 |
| WO | WO 2011/034594 A1 | 3/2011 |
| WO | WO2014173787 A1 | 10/2014 |

OTHER PUBLICATIONS

International Search Report and Written Opinion issued in connection with PCT Application No. PCT/US2014/017431 dated May 16, 2014.

International search report issued in connection with PCT/US2013/070518, Jan. 30, 2014.

Tetsuji Okamura, Performance of a room-temperature rotary magnet refrigerator, Nov. 28, 2005, Elsevier.

Journal of Alloys and Compounds, copyright 2008 Elsevier B.V. Evaluation of Ni-Mn-In-Si Alloys for Magnetic Refrigerant Application, Rahul Das, A. Perumal and A. Srinivasan, Dept of Physics, Indian Institute of Technology, Oct. 10, 2011.

Effects of annealing on the magnetic entropy change and exchange bias behavior in melt-spun Ni-Mn-In ribbons, X.Z. Zhao, C.C. Hsieh, et al Science Direct, Scripta Materialia 63 (2010).

\* cited by examiner

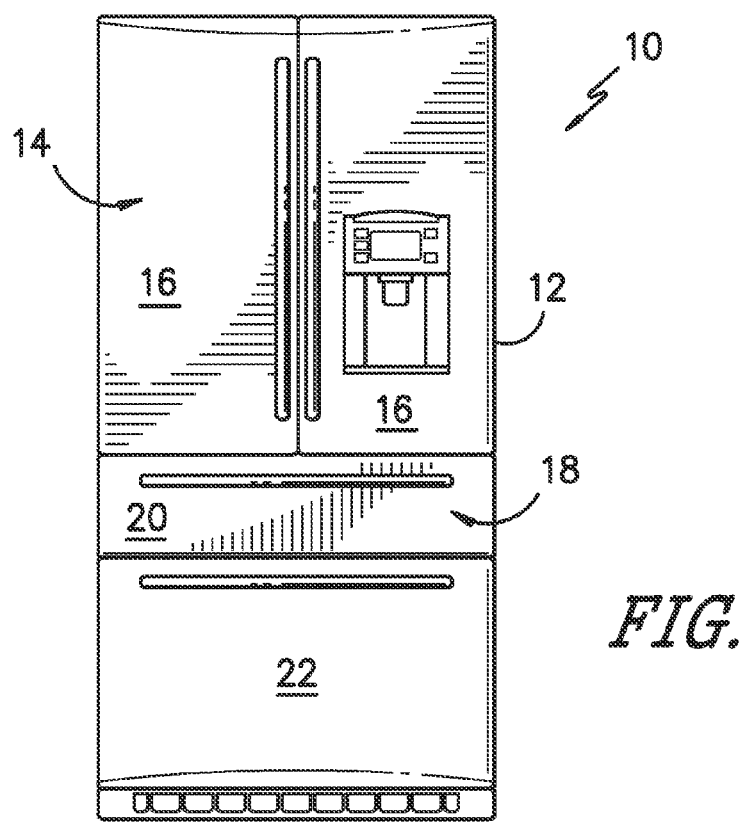
FIG. -1-
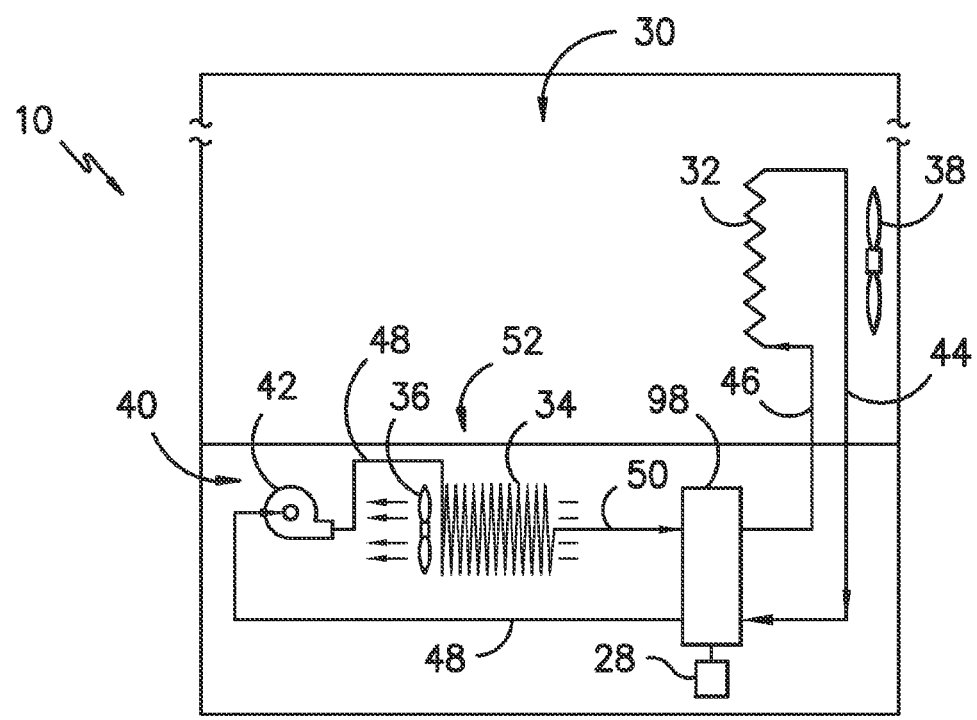
FIG. -2-

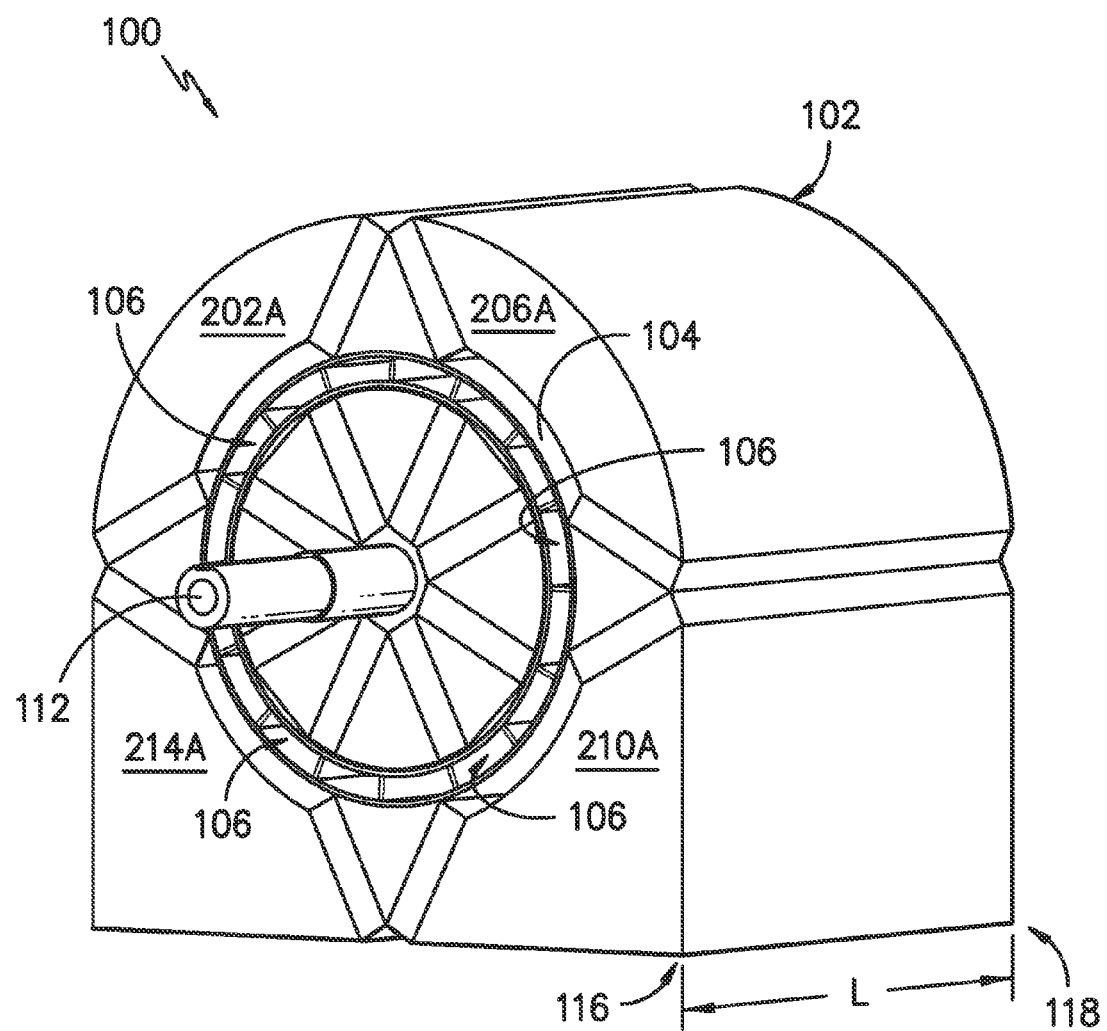
FIG. -3-

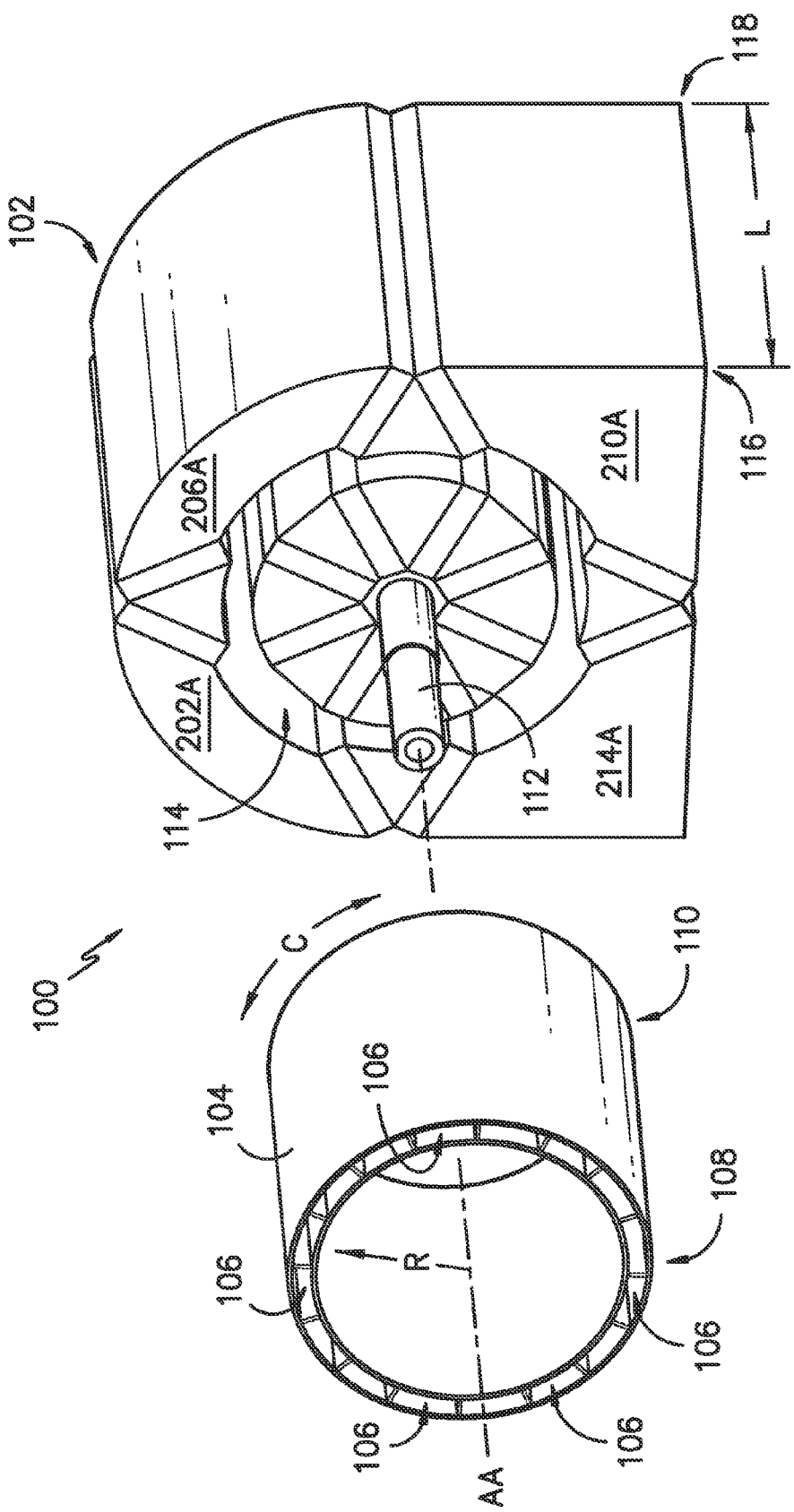
FIG. -4-

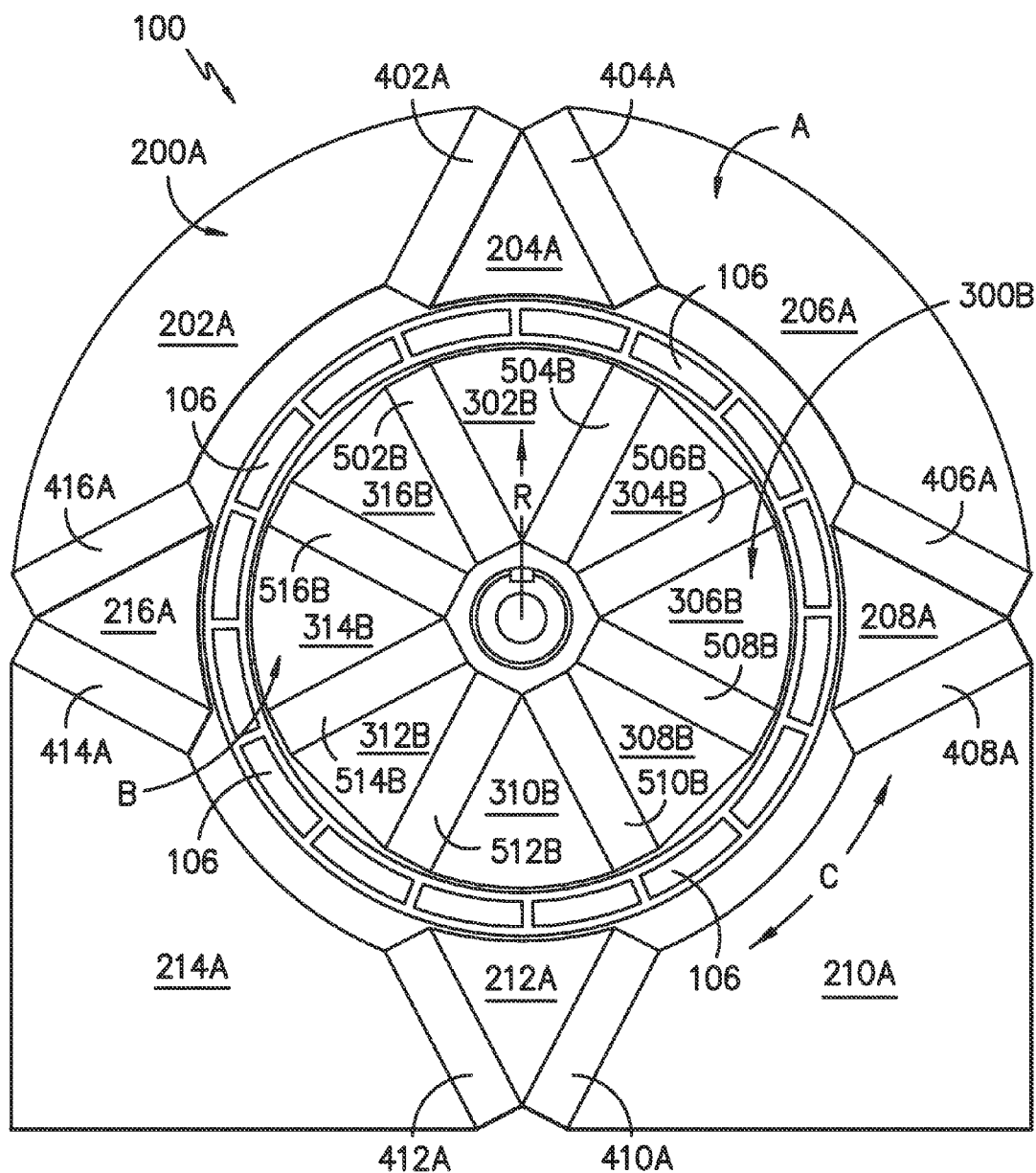
FIG. -5-

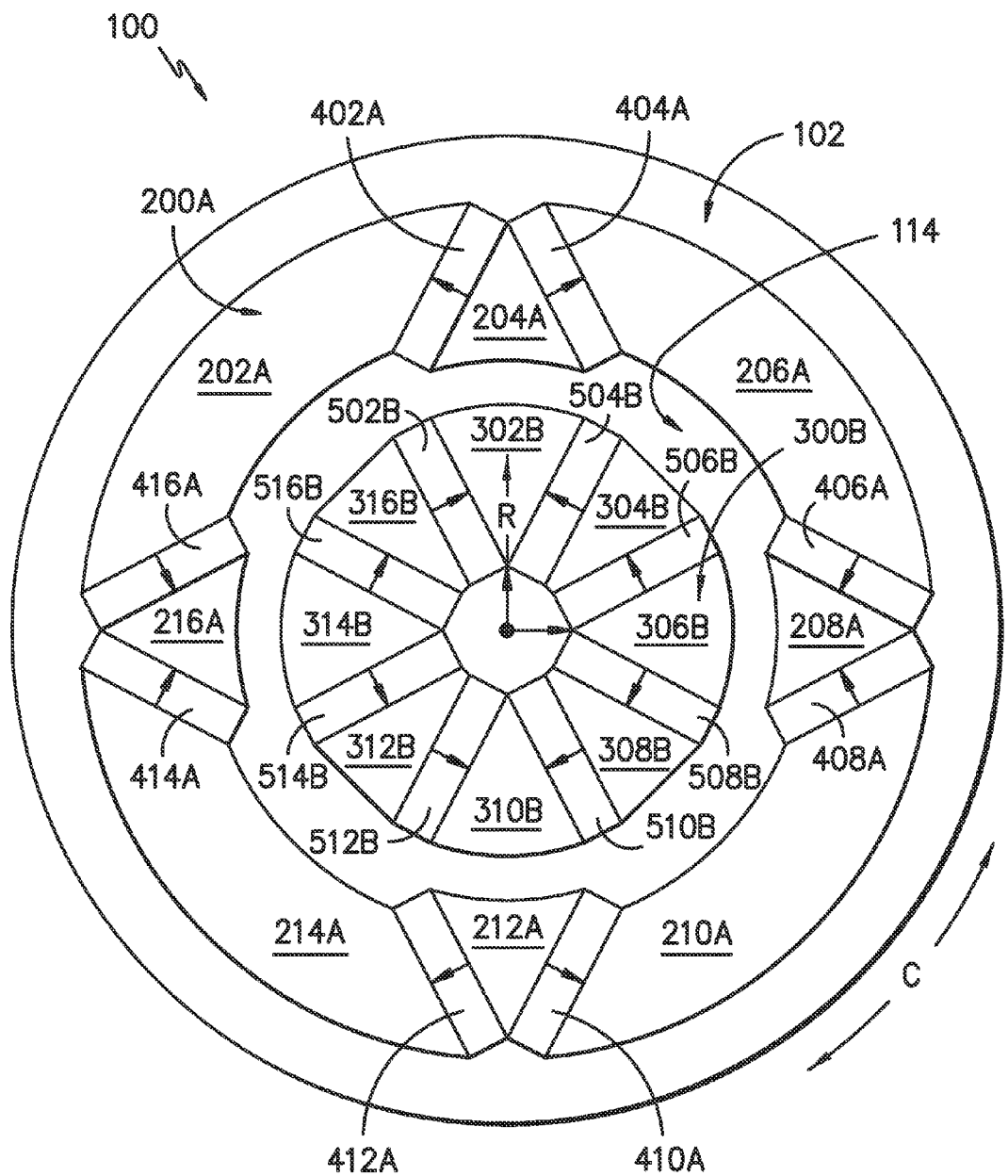
FIG. -6-

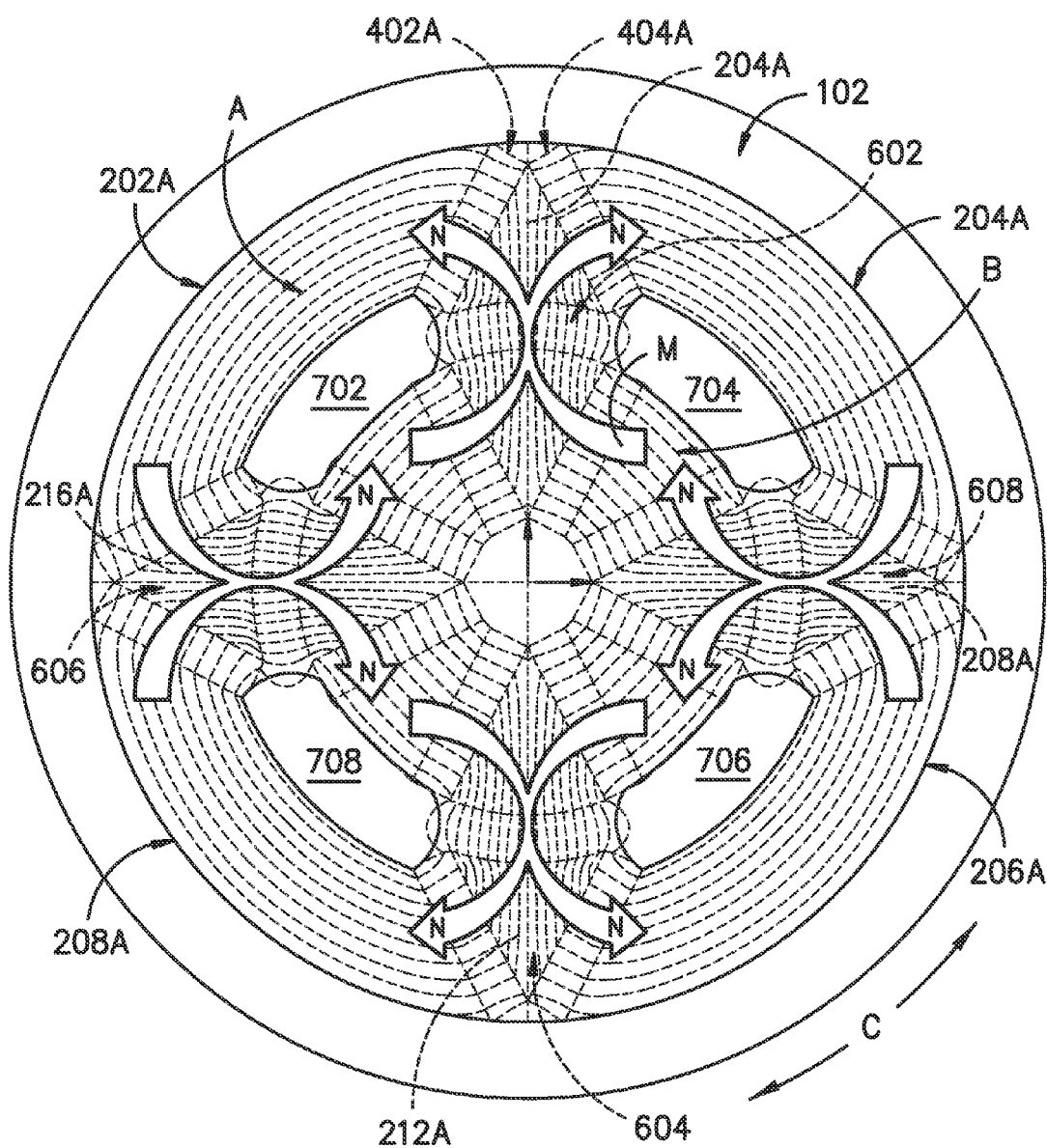
FIG. -7-

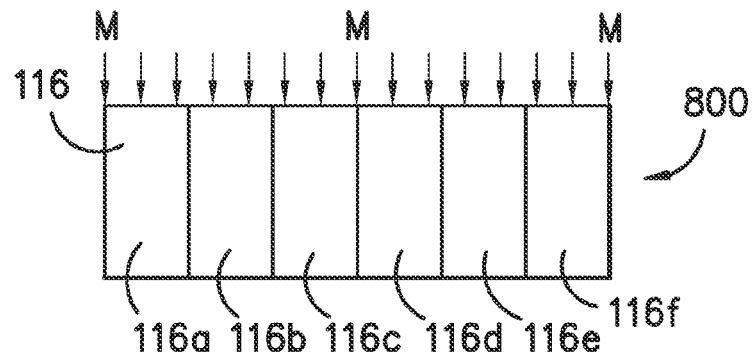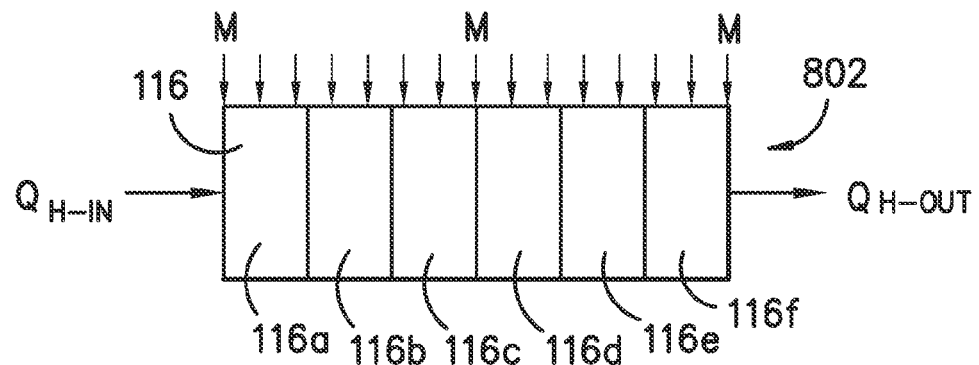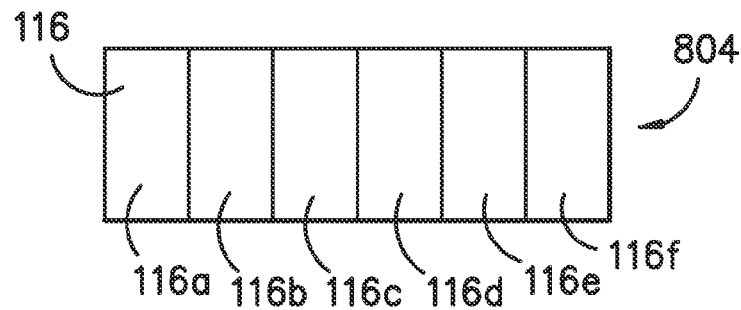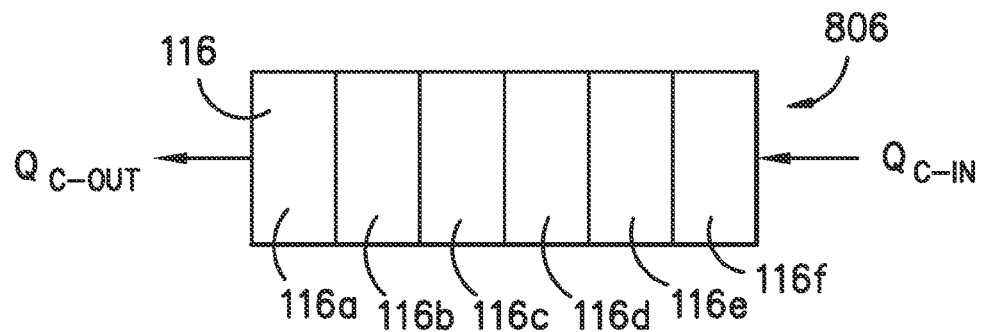
FIG. -8-

MAGNETIC DEVICE FOR MAGNETO CALORIC HEAT PUMP REGENERATOR

FIELD OF THE INVENTION

The subject matter of the present disclosure relates generally to a magnetic device for a regenerator of a magneto-caloric heat pump.

BACKGROUND OF THE INVENTION

Magneto caloric material (MCM)—i.e. a material that exhibits the magneto caloric effect—provides a potential alternative to fluid refrigerants used in e.g., heat pump applications. In general, the magnetic moments of a normal MCM will become more ordered under an increasing, externally applied magnetic field and cause the MCM to generate heat. Conversely, decreasing the externally applied magnetic field will allow the magnetic moments of the MCM to become more disordered and allow the MCM to absorb heat. Some MCM types exhibit the opposite behavior—i.e. generating heat when a magnetic field is removed and becoming cooler when placed into the magnetic field. This latter type can be referred to as inverse or para-magneto caloric material. Both normal and inverse MCM are referred to collectively herein as magneto caloric material or MCM.

The theoretical cycle efficiency of a refrigeration cycle based on an MCM and the magnetic caloric effect can be significantly higher than for a comparable refrigeration cycle based on a fluid refrigerant. However, challenges exist for the practical and cost competitive use of an MCM. In addition to the development of suitable types of MCM, equipment that can attractively utilize an MCM is still needed.

One such challenge relates to the magnets used to provide magnetic flux for acting upon the MCM. Rare earth magnets that can provide the level of magnetic flux required are relatively expensive and can account for as much as 50 percent of the cost of an MCM-based heat pump. Additionally, the cost of rare earth magnets can be volatile, which in turn can affect the price stability of MCM-based heat pump equipment such as e.g., refrigerator appliances and air-conditioning systems. The manufacture of magnets into specific shapes as may be required depending upon the heat pump design can also significantly increase their cost.

Increasing the field strength provided by the magnet(s) used with an MCM-based heat pump can improve the magnetic caloric response of the MCM. Increasing the volume of the magnetic field may also improve efficiency of the MCM-based heat pump and a minimum magnetic field strength may be needed to achieve optimum performance. Unfortunately, the size of the magnet increases quadratically with increases in the required field strength and size. Further, where iron is used to help shape the magnetic field, such can undesirably increase the weight of the MCM-based heat pump.

Accordingly, a magnetic device for a magnetocaloric (i.e. MCM-based) heat pump would be useful. More particularly, a magnetic device that can provide high magnetic field strength where needed while optimizing the amount of rare earth magnets required would be beneficial. Such a device that can also optimize the amount of iron or other materials used to form the magnetic field would also be useful.

BRIEF DESCRIPTION OF THE INVENTION

The present invention provides a magnetic device for a magneto caloric heat pump regenerator. Magnets are arranged within two magnetic flux circuits in a manner than that provides at least four fields of increased magnetic flux density. A regenerator can be used to move working units of magneto caloric material through the fields of increased magnetic flux to provide for heating and cooling as part of heat pump cycle. The orientation of the magnets provides concentrated fields of magnetic flux to induce the magneto caloric effect while optimizing the size of the magnets required to create the fields. The regenerator can be used as part of e.g., a heat pump or a refrigerator appliance or an air-conditioning system. Additional aspects and advantages of the invention will be set forth in part in the following description, or may be apparent from the description, or may be learned through practice of the invention.

In one exemplary embodiment, the present invention provides a magnetic device for a magnetocaloric heat pump. The device includes an outer magnetic flux circuit having a first plurality of magnets arranged in pairs along a circumferential direction of the device with magnet polarity of the pairs alternating between north poles facing inward and north poles facing outward from pair to pair along the circumferential direction. An inner magnetic flux circuit is located radially inward from the outer magnetic flux circuit and includes a second plurality of magnet arranged along the circumferential direction and spaced apart from each other. The outer magnetic circuit and the inner magnetic circuit create at least four fields of increased magnetic flux density between the outer magnetic circuit and the inner magnetic circuit.

In another exemplary embodiment, the present invention provides a regenerator for a magnetocaloric heat pump. The regenerator includes an outer magnetic flux circuit having a first plurality of magnets arranged in pairs along a circumferential direction of the heat pump with magnet polarity of the pairs alternating between north poles oriented inward and north poles oriented outward from pair to pair along the circumferential direction. An inner magnetic flux circuit is located radially inward from the outer magnetic flux circuit and includes a second plurality of magnets arranged along the circumferential direction and spaced apart from each other. The outer magnetic circuit and the inner magnetic circuit create at least four fields of increased magnetic flux density along an annulus positioned between the outer magnetic circuit and the inner magnetic circuit. A plurality of working units are arranged adjacent to each along the circumferential direction and extend between a first end of the regenerator and a second end of the regenerator, each working unit include magneto caloric material. The working units are rotatable relative to the outer and inner magnetic flux circuits.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides an exemplary embodiment of a refrigerator appliance of the present invention.

FIG. 2 is a schematic illustration of an exemplary heat pump system of the present invention positioned in an exemplary refrigerator with a machinery compartment and at least one refrigerated compartment.

FIG. 3 is a perspective view of an exemplary embodiment of a regenerator of the present invention.

FIG. 4 is an exploded view of the exemplary regenerator of FIG. 3.

FIG. 5 is a front view of the exemplary regenerator of FIG. 3.

FIG. 6 is a partial front view of an exemplary magnetic device as may be used with the exemplary regenerator of FIG. 3.

FIG. 7 is schematic view depicting concentrated fields of magnetic flux as further described herein.

FIG. 8 is a schematic representation of an exemplary method of operation of a regenerator of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, an exemplary embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. The drawers 20, 22 are "pull-out" type drawers in that they can be manually moved into and out of the freezer compartment 18 on suitable slide mechanisms.

Refrigerator 10 is provided by way of example only. Other configurations for a refrigerator appliance may be used as well including appliances with only freezer compartments, only chilled compartments, or other combinations thereof different from that shown in FIG. 1. In addition, the regenerator or heat pump system of the present invention is not limited to appliances and may be used in other applications such as e.g., air-conditioning, electronics cooling devices, and others. Thus, it should be understood that while the use of a heat pump to provide cooling within a refrigerator is provided by way of example herein, the present invention may also be used in other applications to provide for heating and/or cooling as well.

FIG. 2 is a schematic view of another exemplary embodiment of a refrigerator appliance 10 including a refrigeration compartment 30 and a machinery compartment 40. In particular, machinery compartment 30 includes an exemplary heat pump system 52 of the present invention having a first heat exchanger 32 positioned in the refrigeration compartment 30 for the removal of heat therefrom. A heat transfer fluid such as e.g., an aqueous solution, flowing within first heat exchanger 32 receives heat from the refrigeration compartment 30 thereby cooling its contents. A fan 38 may be used to provide for a flow of air across first heat exchanger 32 to improve the rate of heat transfer from the refrigeration compartment 30.

The heat transfer fluid flows out of first heat exchanger 32 by line 44 to heat pump 98. As will be further described herein, the heat transfer fluid receives additional heat associated with the magneto caloric effect provided by MCM in heat pump 98 and carries this heat by line 48 to pump 42 and then to second heat exchanger 34. Heat is released to the environment, machinery compartment 40, and/or another location external to refrigeration compartment 30 using second heat exchanger 34. A fan 36 may be used to create a flow of air across second heat exchanger 34 and thereby improve the rate of heat transfer to the environment. Pump 42 connected into line 48 causes the heat transfer fluid to recirculate in heat pump system 52. Motor 28 is in mechanical communication with heat pump 98 as will be further described.

From second heat exchanger 34 the heat transfer fluid returns by line 50 to heat pump 98 where, as will be further described below, due to the magneto caloric effect, the heat transfer fluid loses heat to the MCM in heat pump 98. The now colder heat transfer fluid flows by line 46 to first heat exchanger 32 to receive heat from refrigeration compartment 30 and repeat the cycle as just described.

Heat pump system 52 is provided by way of example only. Other configurations of heat pump system 52 may be used as well. For example, lines 44, 46, 48, and 50 provide fluid communication between the various components of the heat pump system 52 but other heat transfer fluid recirculation loops with different lines and connections may also be employed. Valves can be placed in one or more of lines 44, 46, 48, and 50 to e.g., control flow and may communicate with a controller (now shown) configured for operating heat pump system 52 according to certain exemplary aspects of the present invention. Additionally, pump 42 can also be positioned at other locations or on other lines in system 52. Pump 42 may be e.g., a variable speed pump operated by a controller according to certain exemplary aspects of the present invention. Still other configurations of heat pump system 52 may be used as well. Heat pump system 52 could also be configured with e.g., air-conditioning systems and other applications in addition to a refrigeration appliance.

FIGS. 3 and 5 provide perspective and front views, respectively, of an exemplary regenerator 100 of the present invention as may form part of e.g., heat pump 98. FIG. 4 provides an exploded perspective view of regenerator 100. As shown, regenerator 100 includes a housing 104 having a plurality of chambers 106 into which working units 116 (FIG. 8) of magneto caloric material (MCM) are received. The chambers 106 and their corresponding working units 116 are arranged adjacent to each other along circumferential direction C and extend along an axial direction AA (defined by axis AA) between a first end 108 and a second end 110 of regenerator 100. For purposes of illustration, chambers 106 are shown empty in FIGS. 3, 4, and 5—it being understood that each in operation each chamber 106 would be partially or completely filled with a working unit 116 of MCM. In other embodiments of the invention, working units 116 be joined together such that housing 104 is not required.

Regenerator housing 104 is received within an annulus 114 (FIG. 4) defined between an outer magnetic flux circuit A and an inner magnetic flux circuit B. As best shown in FIG. 5, for this exemplary embodiment, the outer magnetic flux circuit A includes a first plurality of magnets 400A that includes magnets 402A, 404A, 406A, 408A, 410A, 412A, 414A, and 416A. Outer magnetic flux circuit also includes a first plurality of flux transmitting elements 200A made up of elements 202A, 204A, 206A, 208A, 210A, 212A, 214A, and 216A. By way of example, each flux transmitting element contains iron and/or other materials that allow the transmission of magnetic flux therethrough.

The first plurality of flux transmitting elements 200A and the first plurality of magnets 400A of outer magnetic flux circuit A are arranged in an alternating manner along circumferential direction C. For example, along a clock-wise direction in FIG. 5, the sequence includes flux transmitting element 202A, magnet 402A, flux transmitting element 204A, magnet 404A, and so forth all the way around to magnet 416A. For this exemplary embodiment, the flux transmitting elements and magnets are placed adjacent to, and in contact with, each other along circumferential direction C such that minimal or no gaps are present.

Referring now to FIG. 6, the first plurality of magnets of 400A of the outer magnetic flux circuit A are arranged in pairs with the magnet polarity of the pairs alternating between north poles inward and north poles outward from pair to pair along circumferential direction C. More specifically, as used herein, the arrows on each magnet point towards the north pole N of the magnet and away from south pole S of the magnet where "north pole" and "south pole" are conventional designations as will be understood by one or ordinary skill in the art.

Accordingly, as shown in FIG. 6, magnet pair 402A/404A and magnet pair 410A/412A are each positioned with their north poles N oriented outward from each other. Magnet pairs 406A/408A and 414A/416A are each positioned with their north poles N oriented inward to each other. In addition, this orientation alternates from magnet pair to magnet pair along circumferential direction C between outward and inward.

For this embodiment, the magnets of each pair (402A/404A, 406A/408A, 410A/412A, 414A/416A) are each separated by a flux transmitting element (204A, 208A, 212A, or 216A) having a substantially triangular cross-section along an end view as shown in FIGS. 5 and 6. In turn, each pair of magnets (402/404A, 406/408A, 410/412A, 414/416A) is separated by a flux transmitting element (202A, 206A, 210A, or 214A) having a substantially arcuate shape along an end view as shown in FIGS. 5 and 6. As will be further described, the first and second pluralities 200 and 300 of flux transmitting elements help shape and transmit the magnetic field created by magnetic device 102.

Referring again to FIG. 5, for this exemplary embodiment, the inner magnetic flux circuit B includes a second plurality of magnets 500B made up of magnets 502B, 504B, 506B, 508B, 510B, 512B, 514B, and 516B. Inner magnetic flux circuit B also includes a second plurality of flux transmitting elements 300B made up of elements 302B, 304B, 306B, 308B, 310B, 312B, 314B, and 316B. By way of example, each flux transmitting element contains iron and/or other materials that allow the transmission of magnetic flux therethrough.

The second plurality of flux transmitting elements 300B and the second plurality of magnets 500B of inner magnetic flux circuit B are arranged in an alternating manner along circumferential direction C. For example, along a clock-wise direction in FIG. 5, the sequence includes flux transmitting element 302B, magnet 502B, flux transmitting element 304B, magnet 504B, and so forth all the way around to magnet 516B. For this exemplary embodiment, the flux transmitting elements and magnets are placed adjacent to, and in contact with, each other along circumferential direction C such that minimal or no gaps are present.

Referring now to FIG. 6, the second plurality of magnets 500B of the inner magnetic flux circuit B are arranged in pairs where the polarity of the magnets of a given pair are the same while the polarity alternates from pair to pair along the circumferential direction. For example, magnet pair 504B/506B and magnet pair 512B/514B each have north poles N facing in the same direction (counter-clockwise in this view) along circumferential direction C. Magnet pair 508B/510B and magnet pair 514B/516B each have north poles N facing in the same direction (clockwise in this view) along circumferential direction C but opposite to pairs 504B/506B and 512B/514B. Furthermore, the polarity of the magnet pairs of the second plurality of magnets 500 alternates along circumferential direction C as best shown in FIG. 6.

The regenerator housing 104 along with working units 116 rotates along circumferential direction C (FIG. 5) about axis A. This can be accomplished by rotating regenerator housing 104 within annulus 112, or by rotating the first and/or second plurality of magnets 400 and 500 relative to regenerator housing 104. For example, the second plurality of magnets 500 can be rotated using shaft 112.

By way of example, when regenerator housing 104 is rotated relative to the first and second plurality of magnets 400 and 500, the MCM of each working unit 116 is moved through concentrated fields of magnetic flux M. Referring now to FIG. 7, for this exemplary embodiment of magnetic device 102, four concentrated fields of magnetic flux 602, 604, 606, and 608 are created as depicted by magnetic flux arrows M. The lines of magnetic flux are indicated by dashed lines in FIG. 7.

Based on the orientation of magnets shown in FIG. 6, magnetic flux fields 602 and 606 emanate from the inner magnetic flux circuit B and are oriented with a north pole N facing radially outward. Conversely, magnetic flux fields 606 and 608 emanate from the outer magnetic flux circuit A and are oriented with a south pole facing radially inward. Regions 702, 704, 706, and 708 represent locations of minimal or no magnetic flux around annulus 114.

Accordingly, assuming by way of example a clock-wise movement of working units 116, each working unit 116 experiences an alternating pattern of concentrated magnetic flux density M and minimal (or non-existent) flux density. For the exemplary embodiment, shown in FIG. 7, each working unit 116 would pass through concentrated magnetic flux field 602, low flux field 704, concentrated magnetic flux field 608, and so forth during a complete clockwise revolution. The direction of rotation could be counter-clockwise as well in other embodiments of the invention.

While FIG. 7 depicts four regions of concentrated flux M, in other exemplary embodiments of magnetic device 102 a different number of regions may be used. By way of example, 4, 8, 12, 16 and others may be used as well. Additionally, the orientation of the first and second plurality of magnets may be reversed from the orientation depicted in FIG. 6—which would reverse the direction of arrows the magnetic flux arrows M.

As previously described, each chamber 106 contains a working unit 116 constructed from an MCM. As used herein, the Curie temperature of an MCM refers to a temperature (or temperature range) at which the MCM undergoes the magneto caloric effect due to changes in a magnetic field (e.g., applying or removing the magnetic field). For most MCMs, the magneto caloric effect is not exhibited at single, precise temperature and, instead, occurs over a range. Along axial direction AA, working unit 116 may include a single MCM having a Curie temperature or may, instead, having multiple stages (116a through 116f as shown in FIG. 8) of different MCM with each having a different Curie temperature.

FIG. 8 illustrates an exemplary method of the present invention using a schematic representation of a working unit 116 (with multiple stages of MCM) as it rotates within annulus 114 of magnetic device 102. During step 800, working unit 112 is fully within one of the concentrated fields of magnetic flux 602, 608, 612, and 616 as represented by arrows M. This causes the magnetic moments of the material to orient and the MCM to heat (when a normal MCM is used) as part of the magneto caloric effect. In step 800, heat transfer fluid dwells in the MCM of working unit 116 and, therefore, is heated. More specifically, a heat transfer fluid (such as e.g., water) does not flow through working unit 116 at this time.

In step 802, as working unit 116 continues to rotate, the heat transfer fluid is allowed to flow through the MCM of working unit 116. As indicated by arrow $Q_{H\text{-}OUT}$ in FIG. 8, heat transfer fluid in working unit 116, now heated by the MCM, can travel out of chamber 106 and along e.g., line 48 to the second heat exchanger 34 in the exemplary system of FIG. 2. At the same time, and as indicated by arrow $Q_{H\text{-}IN}$, heat transfer fluid from first heat exchanger 32 flows into working unit 116 from line 44 during step 802. Because heat transfer fluid from the first heat exchanger 32 is relatively cooler than the MCM in working unit 116, the MCM will lose heat to the heat transfer fluid.

Referring again to FIG. 8 and step 804, a housing 104 continues to rotate working unit 116 is moved into the low magnetic flux region 704 where working unit 116 is completely or substantially out of magnetic field M. The absence or lessening of the magnetic field is such that the magnetic moments of the MCM become disordered and the MCM absorbs heat as part of the magneto caloric effect for a normal MCM. During step 804, the heat transfer fluid dwells in the MCM of working unit 116 and, therefore, is cooled by losing heat to the MCM as the magnetic moments disorder.

Referring to step 806 of FIG. 8, as regenerator housing 102 continues to rotate, the heat transfer fluid is allowed to pass through the MCM of working unit 116. As indicated by arrow $Q_{C\text{-}OUT}$ in FIG. 8, heat transfer fluid in working unit 116, now cooled by the MCM, can travel out of housing 102 and along line 46 to the first heat exchanger 32. At the same time, and as indicated by arrow $Q_{C\text{-}IN}$, heat transfer fluid from second heat exchanger 34 flows into working unit 116 from line 50. Because heat transfer fluid from second heat exchanger 34 is relatively warmer than the MCM in working unit 116 at position 5, the MCM will lose some of its heat to the heat transfer fluid. The heat transfer fluid now travels along line 46 to the first heat exchanger 32 to receive heat and cool the refrigeration compartment 30. As regenerator housing 102 is rotated continuously, the above described process of placing each working unit 116 in and out of the concentrated flux fields 602, 604, 606, and 608 is repeated.

By using the concentrated fields of magnet flux 702, 704, 706, and 708 provided by magnetic device 102, regenerator 100 allows for a more efficient use of the rare earth magnets requires for circuits A and B. At the same time, the desired levels of magnetic flux M can be created.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A magnetic device for a magnetocaloric heat pump, comprising:
    an outer magnetic flux circuit, comprising
        a first plurality of magnets arranged in pairs along a circumferential direction of the device with magnet polarity of the pairs alternating between north poles facing inward and north poles facing outward from pair to pair along the circumferential direction;
    an inner magnetic flux circuit located radially inward from the outer magnetic flux circuit and comprising
        a second plurality of magnets arranged along the circumferential direction and spaced apart from each other; and
    wherein the outer magnetic circuit and the inner magnetic circuit create at least four fields of increased magnetic flux density between the outer magnetic circuit and the inner magnetic circuit.

2. The magnetic device for a magnetocaloric heat pump as in claim 1, wherein the outer magnetic flux circuit further comprises:
    a first plurality of flux transmitting elements positioned in an alternating manner along the circumferential direction with the first plurality of magnets.

3. The magnetic device for a magnetocaloric heat pump as in claim 2, wherein the inner magnetic flux circuit further comprises:
    a second plurality of flux transmitting elements positioned in an alternating manner along the circumferential direction with the second plurality of magnets.

4. The magnetic device for a magnetocaloric heat pump as in claim 3, wherein the first and second plurality of flux transmitting elements comprise iron.

5. The magnetic device for a magnetocaloric heat pump as in claim 4, wherein the first plurality of magnets and the first plurality of flux transmitting elements are positioned adjacent to, and in contact with, each other along the circumferential direction.

6. The magnetic device for a magnetocaloric heat pump as in claim 5, wherein the second plurality of magnets and the second plurality of flux transmitting elements are positioned adjacent to, and in contact with, each other along the circumferential direction.

7. The magnetic device for a magnetocaloric heat pump as in claim 1, wherein the outer magnetic circuit and the inner magnetic circuit are separated by an annulus extending about the circumferential direction.

8. The magnetic device for a magnetocaloric heat pump as in claim 1, wherein the magnets of each pair of the first plurality of magnets form an angle in the range of 15 degrees to 45 degrees from each other.

9. The magnetic device for a magnetocaloric heat pump as in claim 1, wherein the magnets of each pair of the first plurality of magnets form an angle of about 30 degrees from each other.

10. The magnetic device for a magnetocaloric heat pump as in claim 1, wherein the magnets of the second plurality of magnets are arranged in pairs of alternating polarity from pair to pair along the circumferential direction.

11. The magnetic device for a magnetocaloric heat pump as in claim 1, wherein the magnetic device defines a radial direction, and wherein the magnets of the second plurality of magnets each have a longitudinal axis that is positioned parallel with the radial direction.

12. The magnetic device for a magnetocaloric heat pump as in claim 1, wherein the magnetic device defines a radial direction, and further comprising a shaft extending along a central axis of the magnetic device, wherein the second plurality of magnets each have a longitudinal axis extending along the radial direction from the shaft.

13. A regenerator for a magnetocaloric heat pump, comprising:
   an outer magnetic flux circuit, comprising
      a first plurality of magnets arranged in pairs along a circumferential direction of the heat pump with magnet polarity of the pairs alternating between north poles oriented inward and north poles oriented outward from pair to pair along the circumferential direction;
   an inner magnetic flux circuit located radially inward from the outer magnetic flux circuit and comprising
      a second plurality of magnets arranged along the circumferential direction and spaced apart from each other;
   wherein the outer magnetic circuit and the inner magnetic circuit create at least four fields of increased magnetic flux density along an annulus positioned between the outer magnetic circuit and the inner magnetic circuit; and
   a plurality of working units arranged adjacent to each along the circumferential direction and extending between a first end of the regenerator and a second end of the regenerator, each working unit comprising magneto caloric material, wherein the working units are rotatable relative to the outer and inner magnetic flux circuits.

14. The regenerator for a magnetocaloric heat pump as in claim 13, further comprising a housing defining a plurality of chambers positioned adjacent to each other along the circumferential direction, each chamber including at least one of the plurality of working units.

15. The regenerator for a magnetocaloric heat pump as in claim 13, wherein the outer magnetic flux circuit further comprises:
   a first plurality of flux transmitting elements positioned in an alternating manner along the circumferential direction with the first plurality of magnets.

16. The regenerator for a magnetocaloric heat pump as in claim 15, wherein the inner magnetic flux circuit further comprises:
   a second plurality of flux transmitting elements positioned in an alternating manner along the circumferential direction with the second plurality of magnets.

17. The regenerator for a magnetocaloric heat pump as in claim 16, wherein the first and second plurality of flux transmitting elements comprise iron.

18. The regenerator for a magnetocaloric heat pump as in claim 13, wherein the outer magnetic circuit and the inner magnetic circuit are separated by an annulus extending about the circumferential direction.

* * * * *